United States Patent

[11] 3,601,964

| [72] | Inventors | Robert E. Fisher<br>Berkeley;<br>Gerald L. Claxton, Albany; John J. Witt, Jr., Walnut Creek, all of, Calif. |
|---|---|---|
| [21] | Appl. No. | 713,799 |
| [22] | Filed | Mar. 18, 1968 |
| [45] | Patented | Aug. 31, 1971 |
| [73] | Assignee | Up-Right, Inc.<br>Berkeley, Calif. |

[54] GRAPE HARVESTING MACHINE
6 Claims, 8 Drawing Figs.

[52] U.S. Cl. .................................................... 56/330
[51] Int. Cl. .................................................... A01g 19/00
[50] Field of Search .......................................... 56/330, 19, 128–130; 209/112, 114, 122, 123

[56] References Cited
UNITED STATES PATENTS

| 3,492,801 | 2/1970 | Olmo et al. | 56/330 |
| 2,471,326 | 5/1949 | Hoyt, Sr. | 56/330 UX |
| 2,660,021 | 11/1953 | McDonell | 56/330 |
| 3,165,879 | 1/1956 | Chapin | 56/330 |
| 3,184,908 | 5/1965 | Rust | 56/330 |
| 3,255,578 | 6/1966 | Pertics | 56/330 |
| 3,303,638 | 2/1967 | Koehn | 56/330 |
| 3,396,521 | 8/1968 | McKibben et al. | 56/330 |
| 3,426,517 | 2/1969 | Duncan, Sr. | 56/330 |
| 3,439,482 | 4/1969 | Orton | 56/330 |
| 3,449,895 | 6/1969 | Pertics | 56/330 |

Primary Examiner—Louis G. Mancene
Assistant Examiner—J. A. Oliff
Attorney—Mellin, Moore & Weissenberger ABSTRACT: A machine, having a framework which straddles two horizontal parallel wires along which are trained fruiting canes, is propelled along the wires in such position. The machine includes a pair of horizontally spaced batons which move upward to strike each wire in a desired pattern along the length of the wire to provide the maximum effectiveness in detaching the grapes from the canes by the impact of the batons. The grapes, along with some foreign matter, are collected in resilient slanting aprons. Airblasts pass over the aprons to blow away much foreign material which might otherwise fall onto the aprons with grapes. A vibratory motion is imparted to the aprons to agitate the material collected thereon, so that the airblasts can blow away much of the foreign matter which might have fallen onto the aprons. The vibratory motion and slant of the aprons also act to feed the grapes onto conveyors which carry them from the machine.

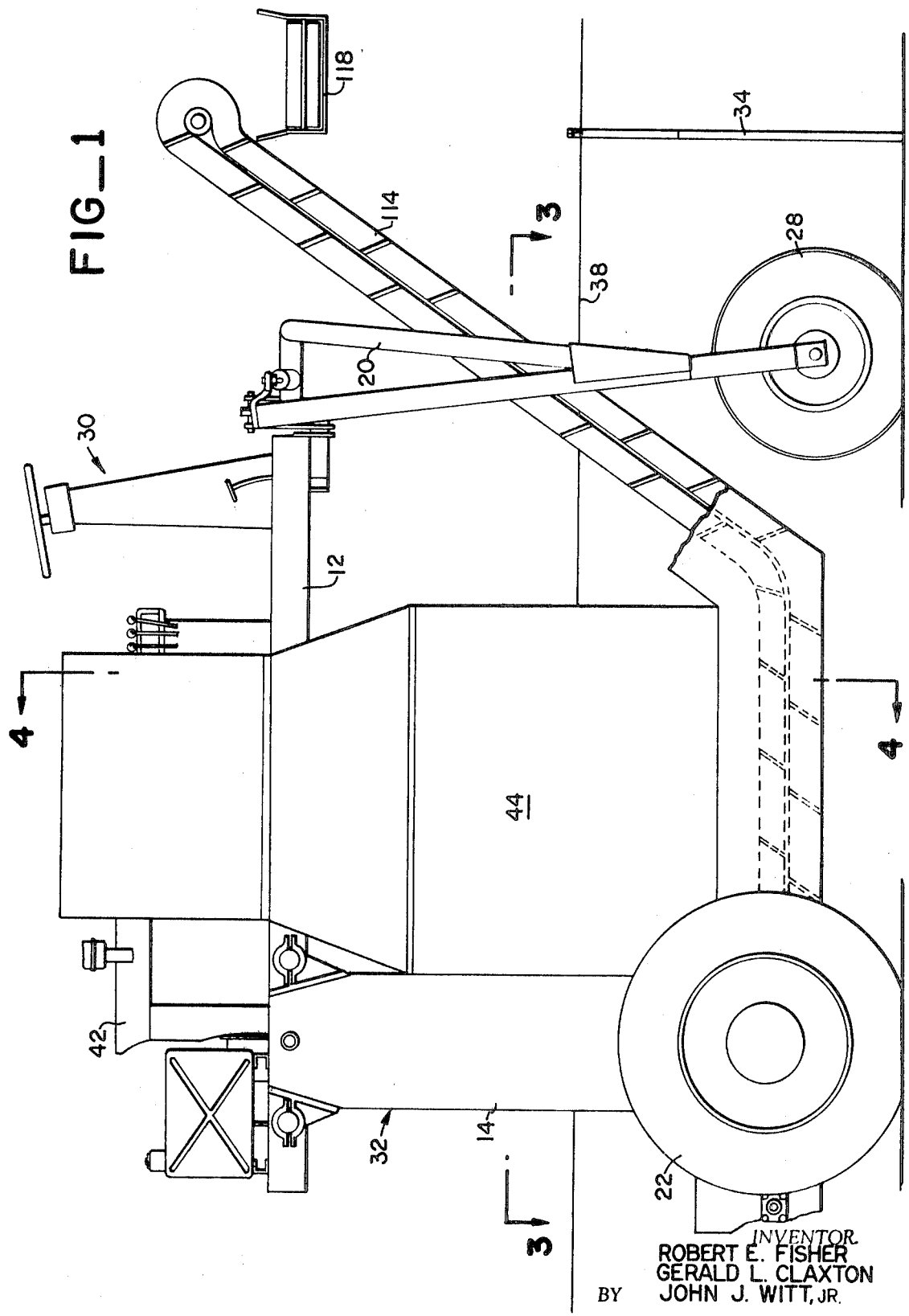

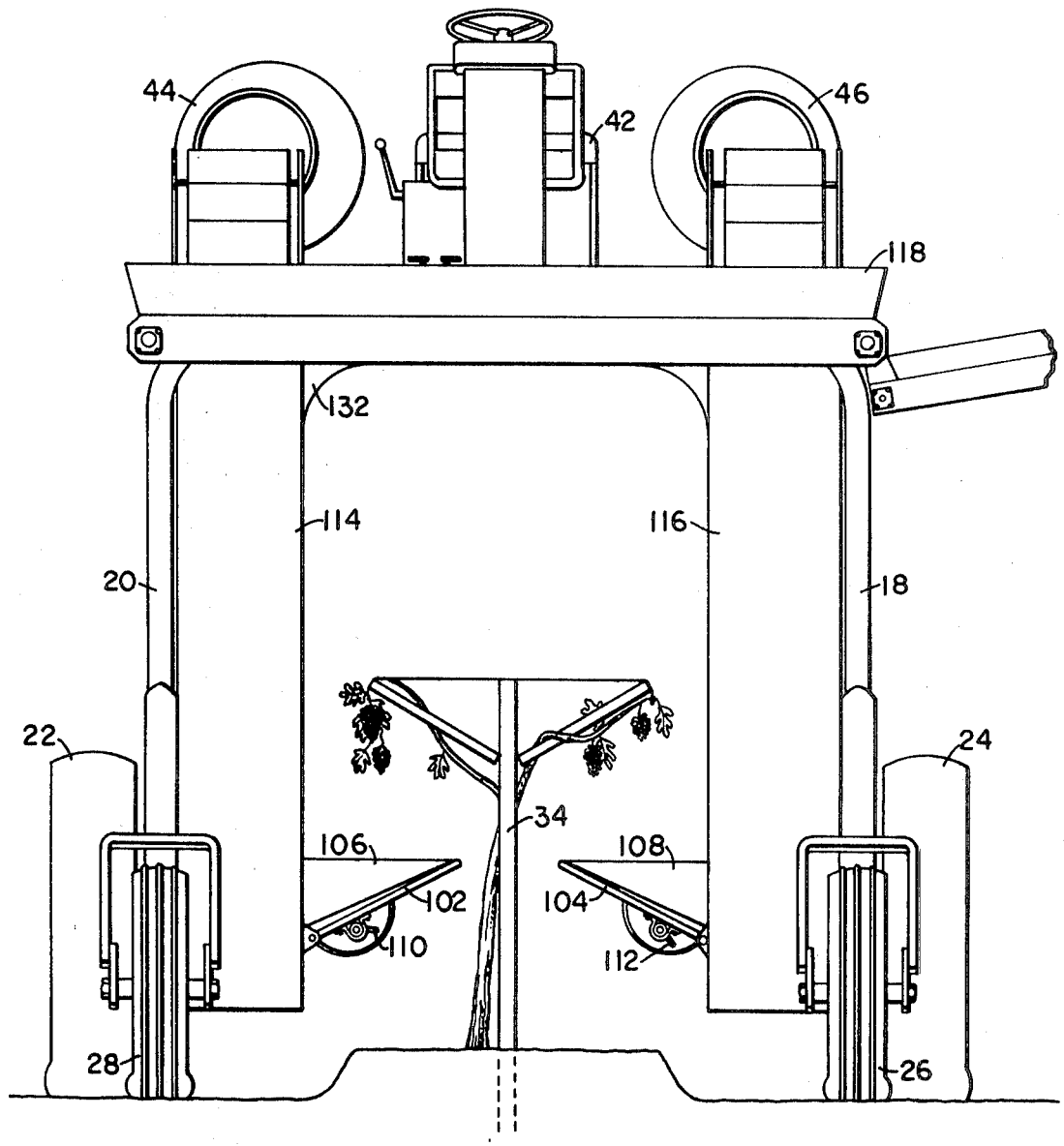
FIG_2

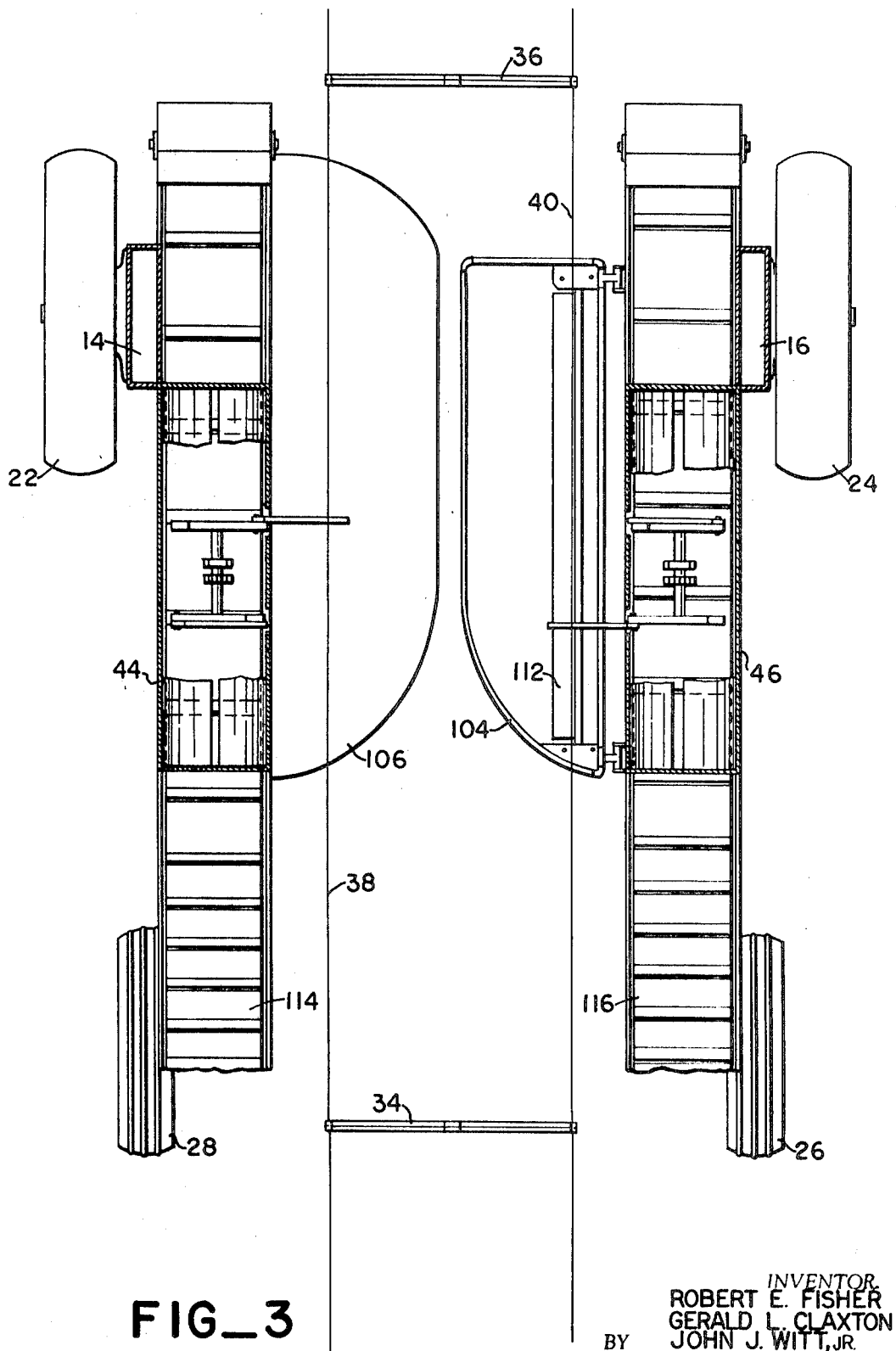

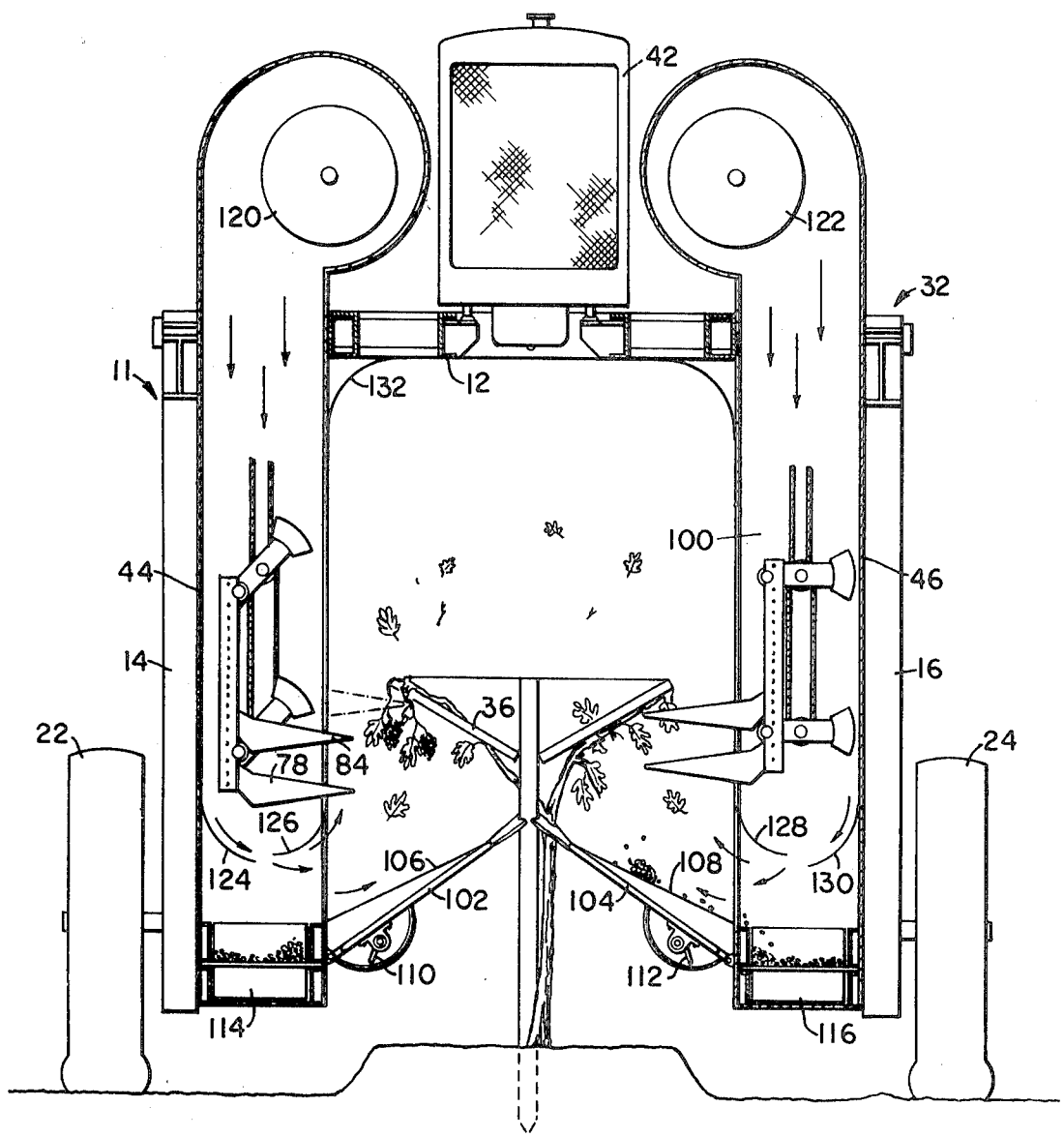
FIG_4
FIG_8

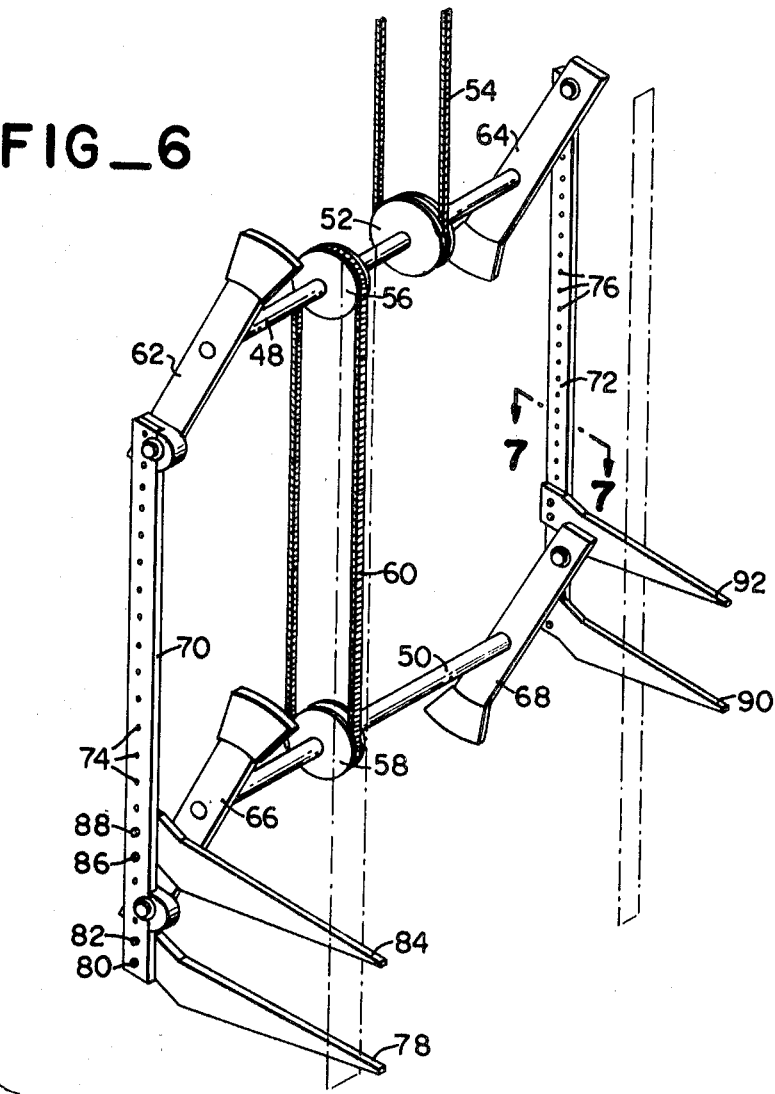

GRAPE HARVESTING MACHINE

BACKGROUND OF THE INVENTION

This invention relates to apparatus for harvesting grapes, and more particularly to an apparatus which utilizes batons which strike the wires upon which fruiting canes are trained to dislodge grapes from the canes.

With the rising cost of labor in recent years it has become more and more necessary to provide suitable apparatus capable of harvesting grapes mechanically. In order to provide a practicable mechanical harvesting device, certain requirements must be filled. Some of these requirements are: (1) substantially all of the grapes growing on fruiting canes must be removed therefrom and gathered; (2) while fulfilling the first requirement, breaking or bruising of the grapes must be kept to a minimum; (3) the grapes must be separated from any foreign matter, such as leaves, broken tendrils, pieces of fruiting cane, dust, or bugs, which may be associated with the grapes or which may be harvested with the grapes during the first operation; (4) the grapes must be carried from the machine in the proper manner, without any possibility of losing some of them during such operation. Furthermore, since the grapes generally grow in rows along strung wires, the machine should be capable of performing such operations while moving along the rows at a steady rate.

It is therefore an object of this invention to provide a grape harvesting machine which can travel along a wire on which grapes are trained and remove and gather substantially all of the grapes therefrom, meanwhile keeping breaking or bruising of the grapes to a minimum.

It is a further object of this invention to provide a grape harvesting machine which, while fulfilling the above objects, is capable of separating the grapes from foreign matter which may have gathered therewith, and carrying them from the machine in proper manner.

SUMMARY OF THE INVENTION

Broadly stated, the machine for harvesting grapes from a fruiting cane disposed along a wire comprises a vehicle including a frame of inverted, substantially U-shaped cross section to straddle the wire and fruiting canes, wheels mounted to the frame for allowing the frame to be moved along the wire in such straddling position, and means for propelling the frame along the wire in such position at a substantially constant velocity. Further included are a pair of horizontally spaced batons, and means on the framework for repeatedly moving the batons upward to strike the wires supporting the fruiting canes and moving the batons away from the wires after such striking, so that the grapes will fall from the fruiting cane, the batons being transported with the frame while being so moved. Means are associated with the frame for collecting the fallen grapes, and for separating and blowing away foreign material.

BRIEF DESCRIPTION OF THE DRAWINGS

These and other objects of the invention will become apparent from a study of the following description and drawings, in which:

FIG. 1 is a side elevation of the grape harvesting machine;
FIG. 2 is a front elevation of the machine of FIG. 1;
FIG. 3 is a sectional view taken along the line 3—3 of FIG. 1, with portions removed;
FIG. 4 is a sectional view taken along the line 4—4 of FIG. 1;
FIG. 5 is a perspective view of a portion of a wall of the machine showing batons extending therefrom;
FIG. 6 is a perspective view of a set of batons and the drive mechanism therefor;
FIG. 7 is a view taken along the line 7—7 of FIG. 6;
FIG. 8 is a schematic view illustrating a fruiting cane and the sequential operation of a pair of batons which strike the fruiting cane as the machine is operated.

DESCRIPTION OF THE PREFERRED EMBODIMENT

The grape harvesting mechanism 10 is shown generally in FIGS. 1–3. Such mechanism 10 includes a vehicle 11 made up of a top frame member 12 and upright frame members 14, 16, 18, 20 which support the top frame member 12 by means of wheels 22, 24, 26, 28. Wheels 26, 28 are pivotable by means of steering means 30 on top frame member 12. The frame members 12, 14, 16, 18, 20 form a frame 32 of inverted, substantially U-shaped cross section. The frame 32 may thus straddle a row of trellises (as 34, 36) which support a pair of wires 38, 40 having fruiting canes growing therealong, and the vehicle 11 may be moved along the wires 38, 40 in such position by means of an engine 42 at a substantially constant velocity.

Fixed to the sides of the vehicle 11 are upright housings 44, 46 which run from adjacent the bottom of the vehicle 11 to above the top frame member 12. Each housing houses machinery as best shown in FIGS. 4–7. A pair of shafts 48, 50 are rotatably supported (by means not shown) within the housing 44. Upper shaft 48 is rotated by a sprocket 52 fixed thereon which is run by a continuous chain 54 from the engine 42. Shaft 50 is rotated with shaft 48 by means of sprocket 56 fixed to shaft 48, sprocket 58 on shaft 50, and a continuous chain 60 running therebetween. Fixed to the ends of shaft 48 are arms 62, 64 which are rotatable therewith. Fixed to the ends of shaft 50 are arms 66, 68 which are rotatable therewith. It will be noted that arm 62 is substantially directly above arm 66, and arm 64 is substantially directly above arm 68.

Pivotally connected to one end of each arm 62, 66 is a connecting brace 70. Pivotally connected to one end of each arm 64, 68 is a connecting brace 72. It will be seen that, as shafts 48 and 50 rotate, the ends of connecting brace 70 describe circular paths. The ends of the connecting brace 72 move in a similar manner. Connecting brace 70 has a plurality of apertures 74 therethrough, and connecting brace 72 has a plurality of apertures 76. A baton 78 is removably fixed to connecting brace 70 by means of fasteners 80, 82 passing through a pair of apertures 74. A baton 84 disposed above baton 78 substantially parallel thereto is removably fixed to connecting brace 70 by means of fasteners 86, 88 passing through another pair of apertures 74. It will be seen that each baton 78, 84 may be fixed in a variety of positions along connecting brace 70. Batons 90, 92 are disposed in a similar fashion along connecting brace 72 and are removably fixed thereto. It is to be noted with importance that arms 62, 64, 66, 68 are positioned so that batons 78, 84 are substantially 180° out of phase with batons 90, 92 as the shafts 48, 50 are rotated.

As an alternative to this design, sprockets 56 and 58 and chain 60 may be eliminated. In such case shaft 50 is rotated with shaft 48 by means of brace 70 running from arm 62 to arm 66, and brace 72 running from arm 64 to arm 68. Proper turning by such means may be insured by setting arms 62 and 64 (and arms 66 and 68) at slightly off 180° out of phase with each other.

Batons 78, 84 describe a rotary motion as shafts 48, 50 rotate, with the body of each baton always being parallel to the other and to itself during such motion. A slot 94 is provided in the inner wall 96 of housing 44 to allow such motion of batons 78, 84, which extend from the housing 44 during a portion of such motion. Batons 90, 92 describe a similar motion as shafts 48, 50 rotate. A slot 98 is provided in inner wall 96 of the housing 44 to allow such motion of the batons 90, 92, which extend from housing 44 during a portion of such motion.

A like mechanism 100 is housed in housing 46, and will not be described in detail.

Fixed relative to the vehicle 11 and extending inwardly thereof are a pair of frameworks 102, 104 which support resilient aprons 106, 108 respectively. The aprons 106, 108 extend from the bases of housings 44, 46 respectively to the standard of a trellis such as 36. Rotatably fixed to framework 102 under apron 106 is a rubber paddle 110 which is positioned to strike the apron 106 each time it rotates. Conventional means (not shown) are included for rotating rubber paddle 110. A similar rubber paddle 112 is provided under apron 108, with means to rotate it. Aprons 106, 108 may thus be vibrated by paddles 110, 112. Endless conveyors 114, 116 are provided adjacent the aprons 106, 108 respectively. These conveyors 114, 116 are positioned to convey items thereon forwardly and upwardly of the vehicle 11 to a cross conveyor 118.

Blowers 120, 122 are positioned at the tops of housings 44, 46 respectively to blow air downward in the housings. Vanes 124, 126, 128, 130 are provided in the housings 44, 46 to direct the airflow through openings in the housings 44, 46 across aprons 106, 108 respectively.

A canopy 132 interconnects the inner walls of housings 44, 46 just under the top frame member 12.

In the operation of the device, the vehicle 11 is positioned so that the frame 32 straddles a row of trellises (as 34, 36) which support wires 38, 40 having fruiting canes growing therealong. The engine 42 is started, and the vehicle 11 is driven along the line of trellises at a rate of approximately 1–2 m.p.h. The means for moving the batons 78, 84, and 90, 92 are actuated, as are the means for moving the batons associated with housing 46. Rubber paddles 110, 112 are set in motion, as are conveyors 114, 116. Airflow means 120, 122 are turned on. It will be understood, of course, that all of these means may be operated by engine 42.

As the vehicle 11 travels along the wires 38, 40, the baton 84 is positioned to move upward to strike the fruiting canes on wire 38 and then move away from the wire and fruiting canes after such striking. This sudden striking causes at least some of the grapes to fall from the fruiting canes and onto apron 106.

It is, of course, important that substantially all of the grapes be removed from the fruiting canes during a single pass by the vehicle 11. Yet this must be done in as rapid a manner as possible to be economical. Thus, the rate of striking of a fruiting cane by baton 84 should be kept as high as possible. However, there is a limit to this, and the limit comes when the interval between strikes is so short that the wire, with fruiting canes thereon, is raised by a strike of the baton and dropped and does not have time to drop back to its rest position before being again struck by the baton, resulting in a loss of effectiveness of the striking. The operation of baton 92 with baton 84 horizontally spaced therefrom allows each strike of each baton to be of maximum effectiveness, meanwhile in effect doubling the number of strikes on the fruiting cane without lowering the speed of vehicle 11, as now explained.

As previously noted, the baton 92 is substantially 180° out of phase with baton 84. The baton 92 moves upward to strike a fruiting cane on wire 38 and then moves away from the fruiting cane after such striking. As noted in FIG. 5, the batons 84, 92 are spaced a distance apart along the wire 38. With the 180° interval between strikes, the baton 92 strikes the fruiting cane at a point in time substantially intermediate the points of time of two successive strikings of the fruiting cane by the baton 84. So, in effect, the total number of strikes of the fruiting cane can be doubled without lowering the speed of vehicle 11. Meanwhile, each strike is effective, because of the spacing of one baton 92 along the wire from the other baton 84, which allows the area most recently struck to settle back to its original position. That is to say, the striking by baton 92 does not tend to hold the wire portion struck by baton 84 up, and likewise the baton 84 does not tend to hold the wire portion struck by baton 92 up. Consequently, the speed of the vehicle 11 need not be lowered.

It has been most effective to time the movement of the vehicle 11 along the wires 38, 40 and the rates of striking by the batons 84, 92 so that the vehicle 11 moves along the wires 38, 40 substantially one-fourth of the distance measured from the baton 84 to the baton 92 along the wire 38 during the time from the striking of the fruiting cane by the baton 84 to the next-in-time striking of the fruiting cane by the baton 92. This results in a striking pattern as shown schematically in FIG. 8.

Therein is shown a fruiting cane 150. Strikes by baton 84 are noted with the letter A, and strikes by baton 92 are noted with the letter B. If the horizontal distance between batons 84, 92 is 12 inches, baton 84 will strike fruiting cane 150 at A1, and baton 92 will strike fruiting cane 150, 9 inches behind A1, since the vehicle has moved one-fourth of the distance measured between the batons 84, 92 along the fruiting cane 150, and the intervals of time between strikes by baton 84, 92 are the same. The next strike takes place by baton 84 at A2, which is 6 inches ahead of A1. The next strike takes place by baton 92 at B2, which is 3 inches before A1. The next strike takes place by baton 84 at A3, which is 12 inches ahead of A1. It will be seen that the strikes of the fruiting cane 150 are evenly distributed therealong, resulting in a maximum efficiency of each strike.

Mechanism 100 operates in an identical manner on a fruiting cane on wire 40.

It will be noted that, although the operation of baton 84 has been described, the baton 78 operates in an identical manner, but in a lower position than baton 84. Two such batons are provided, particularly on the forward part of the machine, to insure that proper striking takes place whether the wire 38 is sagging under a heavy load, or many of the grapes have fallen off and the wire 38 no longer sags to such a great extent. The baton 92 has also been provided to move with baton 90 for the same reason. The distances between batons 78, 84, and batons 90, 92 have been provided as adjustable so that such proper striking of such sagging or nonsagging wire 38 can take place.

At this point, due to the striking of the batons as described above, grapes have come off the fruiting canes on wires 38, 40 and have fallen onto aprons 106, 108. Of course, much of the foreign matter such as leaves, broken tendrils, pieces of fruiting cane, dust, or bugs will have been blown away during such operation by the air from blowers 120, 122 that is directed by vanes 124, 126, 128, 130 across aprons 106, 108, as described above. However, some of this foreign matter will fall onto the aprons 106 and 108 with the grapes. The rotating rubber paddles 110, 112 vibrate the aprons 106, 108 to agitate the grapes and foreign matter thereon, bouncing them up and down and giving the airflow an opportunity to blow such foreign matter away. Since the machine is moving forward, the foreign matter will be blown to the rear thereof, out of the way.

As shown in FIG. 4, the aprons 106, 108 slant downward toward the conveyors 114, 116. The slant of the aprons and the vibratory motion thereof combines to feed the grapes onto the conveyors 114, 116. From there the conveyors move the grapes forwardly and upwardly of the machine to a cross-conveyor 118. Running the conveyors 114, 116 upwardly and forwardly of the vehicle 11 provides a number of advantages. Firstly, since the foreign matter mentioned above is blown to the rear of the machine, the foreign matter cannot collect on the conveyors 114, 116 and grapes carried thereby. Secondly, the operator of the vehicle can watch the conveying action to make sure it is proper. Thirdly, damage of next year's fruiting canes from snagging by the conveyor is largely avoided.

The canopy 132 acts to protect the operator of the machine, and also acts as a tunnel to direct the foreign matter rearwardly, and not upwardly, of the machine.

The machine could easily be fitted with water spray nozzles positioned ahead of the batons which would spray the fruit to help clean it. In such case, the airflow over aprons 106, 108 would act to dry the wet grapes thereon. Also, with removal of the batons, conventional dusting apparatus could be incorporated with the machine to be used to blow sulfur dust on the leaves and grapes when they are wet, to prevent mildew. The canopy 132, in such case, acts to protect the operator of the machine from the chemicals used.

In the use of this invention, it will be seen that substantially all of the growing grapes may be picked without breaking or bruising thereof. This is insured by the striking sequence by the horizontally spaced batons described above, and the use of vertically spaced batons. Foreign matter collected with the grapes is effectively removed by means of the airflow over the vibratory aprons. The grapes are effectively gathered, and are conveyed in such a manner that no snagging or jamming can occur.

Obviously, the invention can be carried out in many different ways, and the embodiment shown and described is merely illustrative. Consequently, the invention is not to be limited to the specific embodiment shown and described, but only by the following claims.

Having thus described our invention, we claim:

1. A machine for harvesting grapes from a fruiting vine trained along a horizontal wire comprising:
   a. a vehicle including a frame, and means for moving the frame along the wire at a substantially constant velocity;
   b. a first baton;
   c. a first means on the frame for repeatedly moving the first baton in a first substantially vertically extending plane upwardly and underneath the wire to strike the wire and then laterally in said first plane away from underneath the wire after such striking, the first baton being transported with the frame while so moving;
   d. a second baton;
   e. a second means on the frame for repeatedly moving the second baton in a second substantially vertically extending plane upwardly and underneath the wire to strike the wire and then laterally in said second plane away from underneath the wire after such striking, the second baton being transported with the frame a horizontal distance from and rearward of the first baton, said second baton striking the wire at a point of time substantially intermediate the points of time of two successive strikings of the wire by the first baton.

2. A machine according to claim 1 wherein the frame movement along the wire and the rates of striking of the wire by the first and second batons are such that the vehicle moves along the wire substantially one-fourth of the distance measured from the first baton to the second baton along the wire during the time from the striking of the wire by the first baton to the next-in-time striking of the wire by the second baton.

3. A machine according to claim 2 wherein are further included a third baton, the third baton being disposed substantially parallel to and vertically spaced from the first baton and adapted to move therewith.

4. A machine for harvesting grapes from a fruiting cane trained along a wire comprising:
   a. a vehicle including a frame of inverted, substantially U-shaped cross section to straddle the wire and fruiting cane, wheels mounted to the frame for allowing the frame to be moved along the wire in such straddling position, and means for propelling the frame along the wire in such position at a substantially constant velocity;
   b. a baton;
   c. means in the frame for repeatedly moving the baton upward to strike the wire and moving the baton away from the wire after such striking, whereby at least some of the grapes fall from the fruiting cane trained on the wire, the baton being transported with the frame while being so moved;
   d. a resilient apron associated with the frame for collecting the fallen grapes;
   e. means for directing a flow of air over said apron for removing at least some of the foreign matter collected with the grapes;
   f. a resilient rotatable paddle positioned to strike the resilient apron with each rotation to vibrate the resilient apron to agitate the grapes and foreign matter collected therewith and aid in the removal of the foreign matter by the flow of air; and means for rotating the resilient paddle.

5. A machine according to claim 4 and further including conveyor means adjacent the resilient apron, the resilient apron being slanted to feed grapes collected thereon onto the conveyor means.

6. A machine according to claim 5 wherein the conveyor means is positioned to convey the grapes upwardly and forwardly of the frame as the frame is propelled along the wire.